United States Patent [19]

Alon

[11] 3,748,599

[45] July 24, 1973

[54] AMPLITUDE STABILIZER FOR MAGNETIC FIELD MODULATORS

[75] Inventor: Yosef Alon, Jerusalem, Israel

[73] Assignee: Yissum Research Development Company, Jerusalem, Israel

[22] Filed: Feb. 8, 1971

[21] Appl. No.: 113,655

Related U.S. Application Data

[63] Continuation of Ser. No. 770,734, Oct. 25, 1968, abandoned.

[52] U.S. Cl. .................... 332/39, 317/123, 324/118

[51] Int. Cl. .................... H03c 1/00

[58] Field of Search .................. 317/123; 324/0.5 R, 324/117, 118, 130; 332/39, 51

[56] References Cited

UNITED STATES PATENTS

| | | | |
|---|---|---|---|
| 3,028,541 | 4/1962 | Bruma et al. | 324/0.5 R |
| 3,056,080 | 9/1962 | Crandell | 324/0.5 R |
| 3,588,708 | 6/1971 | McBride et al. | 324/0.5 R |

*Primary Examiner*—Roy Lake
*Assistant Examiner*—Lawrence J. Dahl
*Attorney*—Ostrolenk, Faber, Gerb & Soffen

[57] ABSTRACT

A circuit for stabilizing the amplitude of magnetic field modulation conventionally applied to laboratory magnets delivers a phase coherent reference signal, in order to eliminate distortion caused by modulation changes in detecting of magnetic field dependent phenomena.

11 Claims, 4 Drawing Figures

INVENTOR
YOSEF ALON

BY

OSTROLENK, FABER, GERB & SOFFEN
ATTORNEYS

PATENTED JUL 24 1973 3,748,599

SHEET 3 OF 3

AMPLITUDE STABILIZER FOR MAGNETIC FIELD MODULATORS

This is a continuation of U.S. Pat. application Ser. No. 770,734, filed Oct. 25, 1968, now abandoned.

The circuit is adaptable to existing power modulators, and can be used effectively for obtaining a true signal out of synchronous detecting systems, which depend on both amplitude and phase constancy of the magnetic field modulation for an undistorted output. The circuit employs a gain controlled preamplifier deriving its control signal from the integrated output of a pickup coil, also employed as the reference for synchronous detection. The use of the stabilization results in reducing errors caused by modulation changes, even as large as 600 percent in amplitude, to beyond the resolution level of a recorder, which means, practically, elimination of any error, and complete restoration of line shapes.

In a practical example, to be described later, of ESR spectroscopy, an absorption line is distorted and appears as shifted from its real position due to modulation changes in standard equipment used. By applying the stabilizing instrument the line shape is restored and its real position is found, thus small $g$ shifts (which are smaller than the apparent error shift) may be determined accurately.

The present invention relates to magnet systems and more particularly to a novel equalization circuit for use with magnet systems for eliminating errors and distortion which are caused by magnetic modulation instability when such modulation is used for the detection of magnetic field dependent phenomena.

Laboratory magnet systems conventionally incorporate means for sweeping the d.c. magnetic field and, at the same time, modulating the field at an audio rate.

Modulation is applied through the use of a power amplifier for superimposing a sinusoidal change upon the magnetic field through the use of modulation coils which are independently mounted upon the magnet poles.

The modulating amplifier input signal, being derived from a source of proper amplitude and frequency, is also employed as a reference for a synchronous detection system, or some times, as a horizontal axis input for an oscilloscope display of the detected signal.

Most synchronous detection systems depend upon a constant phase difference between their input signal and the actual flux modulation during the d.c. sweep in order to conserve the output scale and form and some times in order to discriminate between signal components which are in phase, or 90° out of phase, with the flux variations. Many of the systems deliver an output signal which is proportional to the flux variations amplitude and therefore depend on the field modulation amplitude constancy during the sweep to avoid excessive output distortion.

Changes in field modulation amplitude and reference phase angle have been found to be the major cause for distortion in systems employing a wide range sweep of the d.c. field at high intensities, where magnetic yoke saturation affects modulation coil impedance. For such a system, modulator that will provide a constant field amplitude and a coherent reference signal is desired for reducing distortion in output line presentation, and avoiding excessive error in line center determination and line amplitudes comparison.

The relation between either the voltage or the current changes and the actual magnetic field changes in a finite resistance modulation coil is strongly affected by the magnetic yoke permeability variations. Therefore, only a small advantage can be gained through the use of a direct a.c. voltage or current feedback circuit for stabilizing the magnetic modulation amplitude and phase over the swept magnetic field range.

Deriving the feedback signal from a separate pickup coil placed in the magnetic gap can, theoretically, provide a way of achieving a constant field modulation. However, in practice, the phase characteristics of the power amplifier and some times those of power-matching reactive components at the modulation coil, confine the use of such a feedback arrangement to a narrow frequency band, small d.c. sweep range, and limited amount of loop gain or stability.

Due to the low sweep rate and slow magnetic yoke permeability changes, an indirect feedback method has been developed which may be employed to stabilize the average amplitude of the field modulation to any practical degree, neglecting the short term stability which is not required. Through the use of automatic gain control (A.G.C.) circuitry, a gain controlled amplifier preceding the power modulator can be made to respond to a slowly varying error signal, which is produced by comparing a signal that represents the average modulation amplitude to some internal reference. The proposed circuit design is characterized by providing such an A.G.C. preamplifier which is controlled by a rectified voltage of an integrated pickup coil signal. The integrated pickup coil signal is also used to provide a coherent reference for synchronous detection or oscilloscope display of the detector output.

Employing such an A.G.C. feedback method to reduce modulation amplitude and phase variations eliminate their influence on the detector output although the modulation waveform remains uncontrolled. However, any influence of the modulation waveform distortion on the output signal, although regarded as a limiting factor in the use of such a system, can be neglected as a practical matter. The total field modulation harmonic distortion expected in a typical modulation setup is usually smaller than a few percent, even when a low grade amplifier is employed, due to the filtering effect of the reactive tuning network used for power matching to the coils, and because of magnet loss characteristics. Since only a small fraction of the total harmonics content is converted to an output error signal — even in the worst case of non-linear process — the error usually found is small compared to a recorder inherent error and limited resolution.

Practically, the accuracy limit of the method would be of the order of 1 percent of the recorded signal, and the design has been found to reduce first-order amplitude and phase errors below this limit.

An instrument has been constructed in accordance with these design and operating characteristics and is comprised of a low power unit which can be used with any modulator-coil system to read, and if so desired, to stabilize the field modulation amplitude anywhere within the modulator capacity. Amplitude stability has been found to be better than 0.5 percent for one decade of open loop gain variation and the reference angle cosine can be maintained within 1 percent of unity over the frequency range from 25 cps to 150 kc. Stabilization of modulation amplitude to 1 percent over three decades of dynamic range at 25 cps to 150 kc has also been achieved.

Employing the indirect feedback method to stabilize the magnetic modulation is most effective in modulation amplitude equalization, but since the modulation waveform is not affected by that method, the phase of the modulated field remains unknown and uncontrolled. This drawback could render the method quite useless for magnetic modulation control in systems that employ one of the many kinds of phase-sensitive detectors. However, by employing the integrated pickup coil signal (which is primarily used for indicating the modulation peak amplitude, and for feeding the A.G.C. circuit with the proper signal so as to achieve an amplitude stability which does not depend on modulation frequency and waveform) as a reference output for phase-sensitive detecting systems, the true waveform and phase of the magnetic modulation becomes available, without the need for further "direct" waveform or phase stabilization.

It is therefore one object of the present invention to provide a novel equalization circuit for use with magnet systems employing an indirect feedback method for achieving stabilization of modulation amplitude over a broad dynamic range.

Still another object of the present invention is to provide a novel stabilization circuit for use with magnet systems employing an indirect feedback loop deriving its input signal from a pickup coil for stabilizing the average amplitude of the field modulation to any practical degree.

Yet another object of the present invention is to provide a novel stabilization circuit for use with magnet systems employing an indirect feedback loop deriving its input signal from a pickup coil for stabilizing the average amplitude of the field modulation to any practical degree and being further characterized by integrating and rectifying the pickup coil signal for the control of an A.G.C. preamplifier to obtain the desired equalization.

Another object of the present invention is to provide a pickup coil in a magnet system which uses the integrated pickup coil signal as a reference for phase sensitive detectors, thus eliminating the need for waveform and phase stabilization, and rendering the A.G.C. method useful for magnet systems which employ phase sensitive detectors.

Still another object of the present invention is to provide a magnet system having a stabilizer circuit which is used as a magnetic modulation meter, that displays the peak amplitude value (uneffected by modulation waveform or frequency) and delivers the true modulation waveform for oscilloscope display.

These as well as other objects of the present invention will become apparent when reading the accompanying description and drawings in which.

Figure 1:
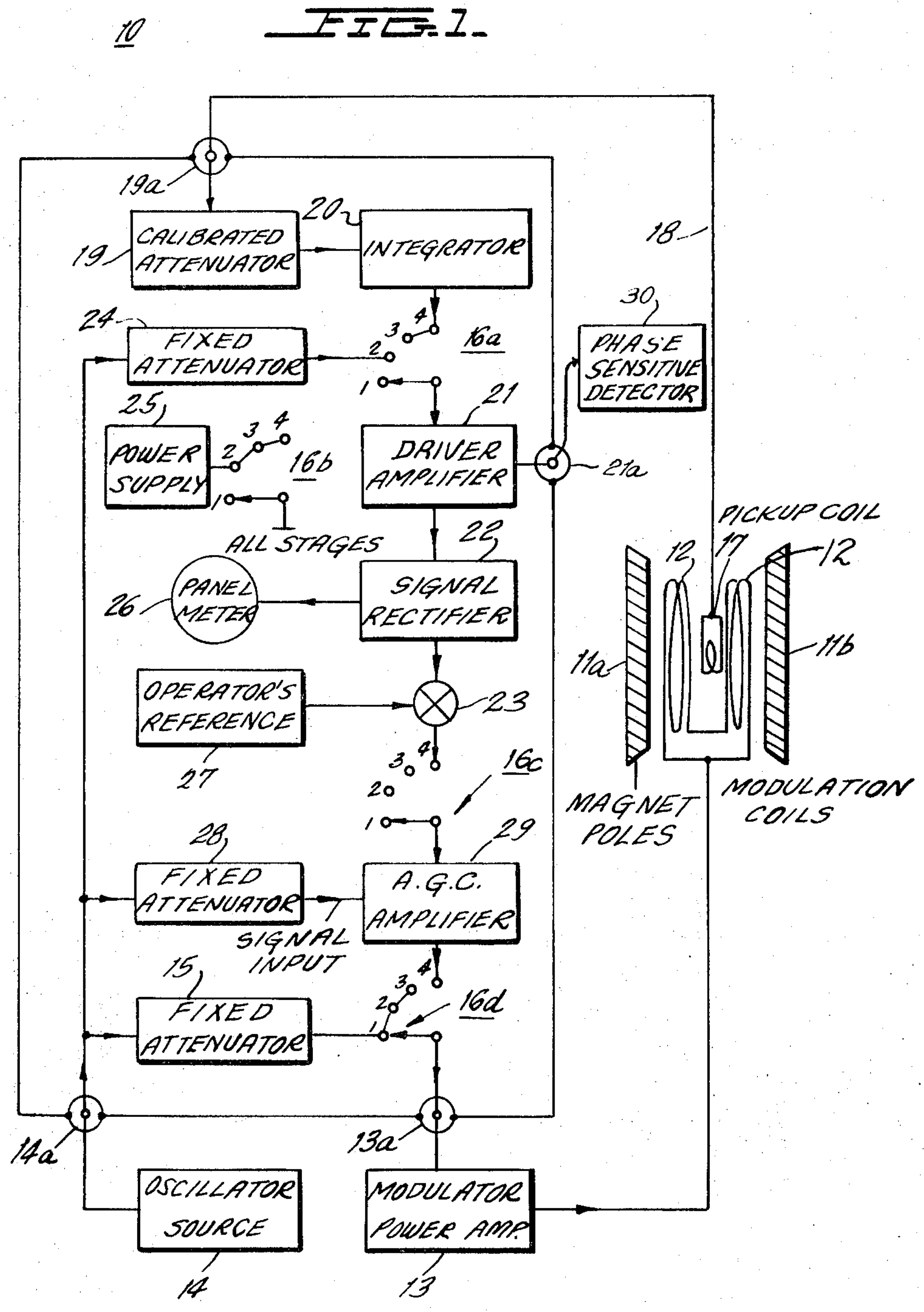
FIG. 1 is a block diagram of an equalization circuit employing the principles of the present invention.

FIG. 1 shows the circuit 10 in block diagram form embodying the concepts of the present invention, which circuit is comprised of a magnet whose poles 11*a* and 11*b* are shown in the figure in schematic fashion for purposes of simplicity. Obviously, the magnet may be of any appropriate configuration and size, depending upon the application. Modulation coils 12, 12 are provided for modulating the d.c. swept magnet, for example, by sinusoidal signals originating from oscillator source 14 coupled through a fixed attenuator circuit 15 and switch portion 16*d* of a ganged switch comprised of switch portions 16*a*–16*d*, which, in turn, is coupled to the input 13*a* of a modulator power amplifier 13 whose output is coupled to the modulation coils.

A pickup coil 17 is positioned between the poles of the magnet for providing a signal which may be employed for equalization. The output of pickup coil 17 is coupled through conductor 18 and input terminal 19*a* to a calibrated attenuator 19 and an integrator circuit 20 which may be selectively coupled through switch portion 16*a* to a driver amplifier 21. The output of amplifier 21 is coupled to a signal rectifier 22 and a summing circuit 23 having an additional input terminal for receiving the output of the operator's reference circuit 27 which is actually subtracted from the output signal of rectifier 22. The output of summing circuit 23 may be selectively coupled to the control input of an automatic gain control amplifier 29 whose output, in turn, may be selectively coupled to the input 13*a* of modulator power amplifier 13. The oscillator source 14 has its output further coupled to additional fixed attenuator circuits 28 and 24 whose outputs may be selectively coupled to the signal input of A.G.C. amplifier 29 and driver amplifier 21, respectively, for purposes to be more fully described. The panel meter 26, coupled to signal rectifier 22 is employed for displaying the peak value of the magnetic modulation, and also for calibration purposes.

The ganged switch comprised of switch portions 16*a*–16*d* is capable of being set in any one of the positions 1–4, depending upon the mode of operation desired. In position 1, power supply 25 is disconnected from all stages except for the oscillator source 14 and modulator power amplifier 13 which allows the oscillator signal to be coupled through fixed attenuator 15 to modulator power amplifier 13, enabling operation of the circuit without the employment of the equalization circuitry.

In position 2 of the ganged switch, the power supply 25 is coupled to all stages of the circuit allowing oscillator level setting for optimum A.G.C. input to be performed by adjusting the oscillator source until the panel meter 26 reaches a proper predetermined setting mark. In this state, only the driver amplifier and rectifier stages of the monitor circuit are in use.

Switch position 3 permits modulation by feeding the oscillator output to the modulator amplifier. The modulation absolute peak-to-peak value can be directly read on the meter as a result of the established circuit comprised of pickup coil 17, lead 18, calibrated attenuator 19, integrator 20, driver amplifier 21 and signal rectifier 22. The amplitude reading obtained at panel meter 26 is unaffected by frequency or waveform and can be used to explore and improve the modulator system capacity over the d.c. magnetic field region in use.

The modulation level is changed by controlling the modulator gain, and the true waveform of the magnetic field changes can be observed by oscilloscope display of the integrator output at the reference output terminal 21*a*.

In accordance with field modulation characteristics observed, when the ganged switch is in position 3, an amplitude value can be chosen for stabilization which is within the modulator capacity at a given d.c. sweep range.

Moving the ganged switch to position 4 closes the A.G.C. loop and the desired stable level is achieved by adjusting the reference for proper reading on the meter. It should be understood that any lower level can be chosen for the stable amplitude value, while the reference output signal at 21*a* which is used for synchronous detection reference or scope horizontal signal, is always kept within a constant, high level region.

In switch position 4, it should be noted that oscillator source 14 is coupled to the input of modulator power amplifier 13 by means of fixed attenuator circuit 28, A.G.C. amplifier 29 and ganged switch section 16*d*. The integrated and rectified output signal derived from pickup coil 17 is compared against the operator's reference 27 and the resultant signal is used to control the gain of A.G.C. amplifier 29 for equalizing the modulation amplitude in order to obtain a distortion free detector output.

A phase sensitive detector 30 may be connected to the output of amplifier 21 to employ the pickup coil signal as a reference for phase sensitive detection and thereby eliminate the need for waveform and phase stabilization and thereby render the A.G.C. method useful for magnet systems which employ phase sensitive detectors.

Figure 2:
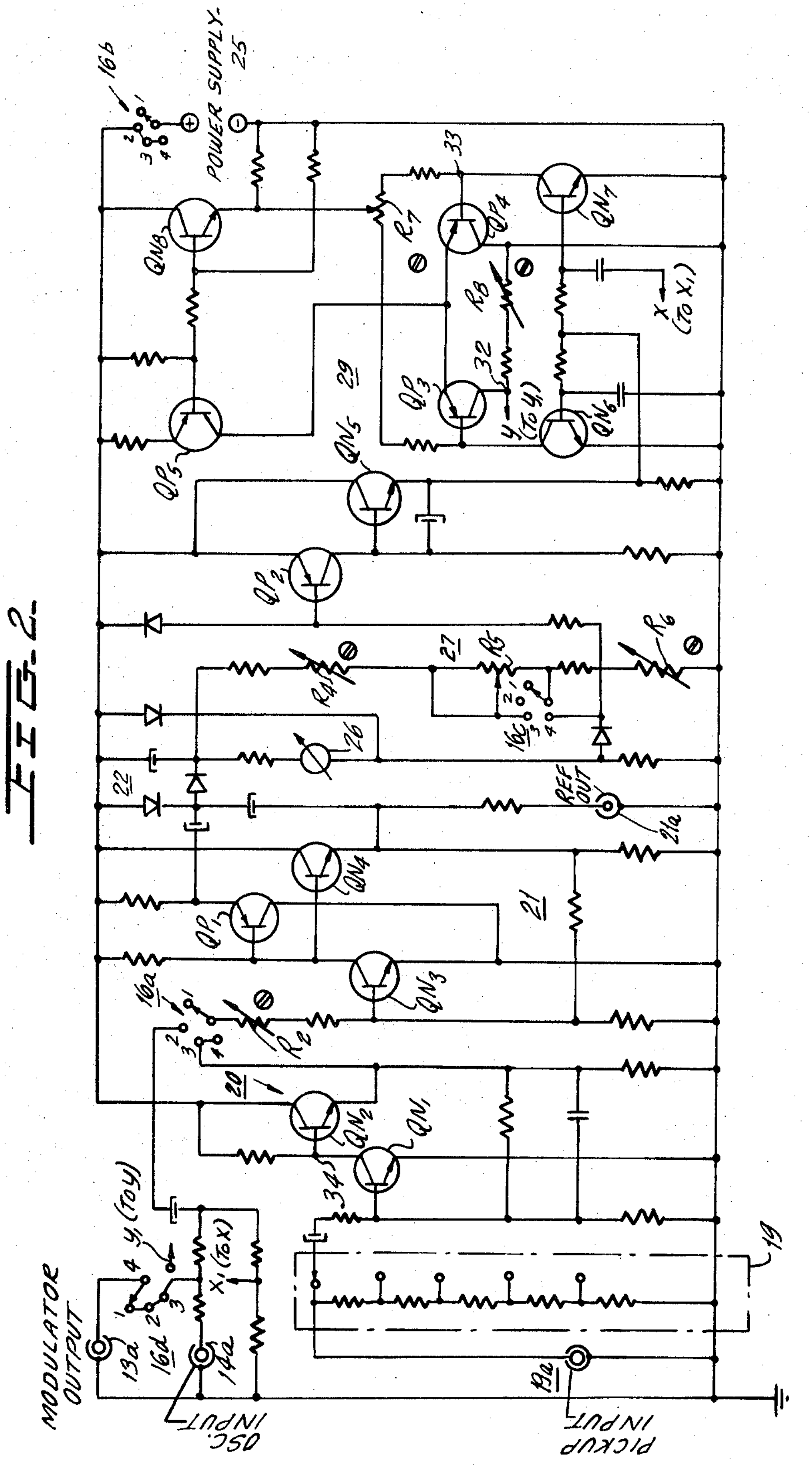
FIG. 2 is a detailed schematic diagram of the equalization circuit of FIG. 1.

FIG. 2 shows a more detailed schematic diagram of the monitor circuit of FIG. 1. As shown therein, the pickup coil of FIG. 1 is coupled to the pickup input terminal 19*a* which, in turn, couples this signal through calibrated attenuator 19 to the base electrode of transistor $QN_1$ which, together with transistor $QN_2$ operates as a Miller integrator for integrating the attenuated signal derived from the pickup coil.

The output of the Miller integrator circuit 20 is coupled through switch stage 16*a* to the driver amplifier circuit 21 comprised of transistors $QN_3$, $QP_1$ and $QN_4$ which are provided to drive the rectifier circuit. Adjustable resistor $R_2$ is provided to control the state gain and is adjusted to coincide with panel meter calibration for a specific pickup coil in use. Adjustable resistors R4 and R6 are used to match the scale calibration of R5 (which serves as the operator's reference control and may be a panel-mounted multiturn potentiometer) to the panel meter readings.

The error d.c. signal is amplified by transistors $QP_2$ and $QN_5$ to serve as the A.G.C. signal. The A.G.C. circuit consists of transistors $QP_3$–$QP_5$ and $QN_6$–$QN_8$.

Design and testing of the monitoring circuitry has indicated that the results are quite favorable. The monitoring circuit can be set to stabilize field modulation amplitudes ranging from 2 to 1000 gauss peak-to-peak. Adjustment may be made to cover any other range simply by changing the pickup coil in use. The circuitry will operate with different modulator coil arrangements, the sensitivity of which should be adjustable. A medium output level oscillator source with adjustable output provides adequate results.

Field modulation stability has been found to be better than 0.5 percent for one decade change of open loop gain, while the cosine of the phase difference between the obtained reference signal (at output 21*a*) and the actual modulation is kept close to unity within 1 percent over the entire amplitude and frequency range.

The electrical accuracy and linearity of the modulation reading circuits, which are used for observing the modulation and optimalization of matching networks over the d.c. field range, have both been found to be better than 1 percent over the entire operating range.

The total circuit current drain has been found to be 12 *ma* from a 9 volt dry cell battery which was used as the only source for power and reference.

Figure 3:
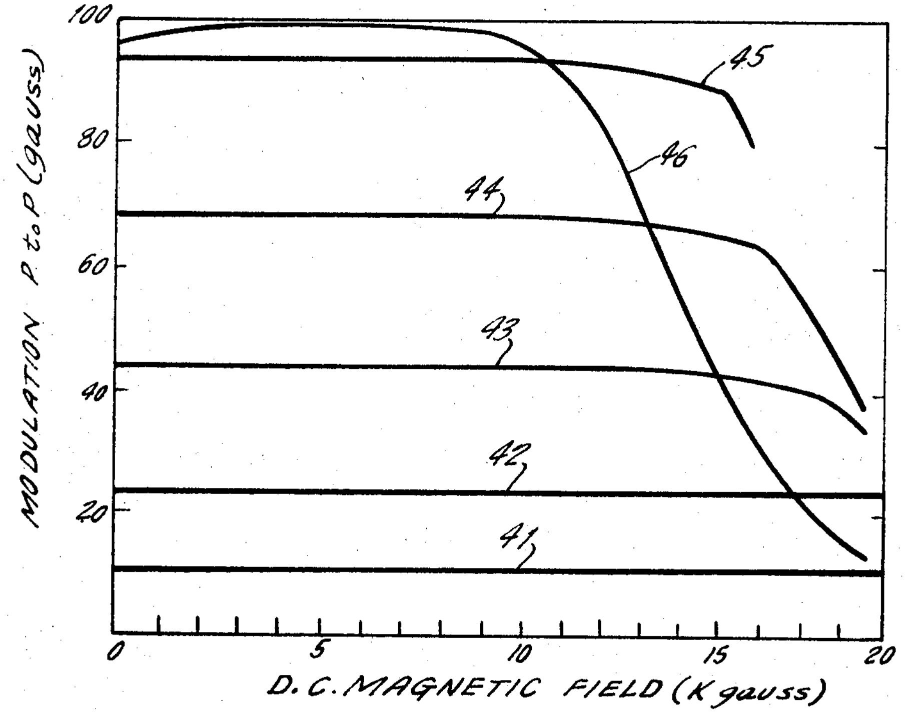
FIG. 3 is a plot showing the effect of the equalization circuit described herein on modulation amplitude variation versus d.c. magnetic field, which curves are useful in describing the successful operation of the invention.

A modulation amplitude recording versus d.c. magnetic field plot is shown in FIG. 3. A PEM 12A–L1 magnet with 7 inch tapered pole pieces was used with modulation coils of 2 ohms resistance and 260 turns each. A 100 watt power amplifier was used to feed the coils at 360 cps through a series capacitor chosen to match the coils' reactance at zero magnetic field. The maximum available modulation is than 180 gauss peak-to-peak.

The integrated signal of the pickup coil as appears at the reference output terminal 21*a* was recorded, using a tuned-amplifier phase sensitive detector. Recording without the use of the stabilization circuitry is indicated by curve 46, which represents the combined scale error of synchronous detector output due to amplitude change and phase shift of the modulation versus the d.c. magnetic field. This recording was done at a level which is slightly lower than the maximum obtainable, to avoid overloading of the amplifier at any point of the d.c. magnetic field. The remaining curves 41–45 of FIG. 3 were recorded under the same conditions, using the monitoring circuitry to stabilize the modulation on different levels.

Considering all of the curves of FIG. 3 as recordings of a unity slope line using the derivative method, curve 46 is found to be heavily distorted, while curves 41–45 are indicative of a true representation of the expected horizontal straight lines. This demonstrates the monitoring circuitry's efficiency in reducing a 600 percent error to less than 1 percent in the region below curve 46, where the modulation power required can be handled by the modulating amplifier.

The modulation waveform is found to be practically distortion-free when monitored at the reference output 21*a* during recording, at points below curve 46.

In one specific application wherein the *g* shift of G*d* in a metal is measured by electronic spin resonance (ESR) spectroscopy, a small shift, in the order of 100 gauss was expected on a relatively broad line of about 1,400 gauss. More specific details relating to ESR spectroscopy may be found in an article by M. Peter et al appearing in Physics Review Volume 126, page 1395 (1962). A more detailed description of this application will be omitted herein for purposes of simplicity. The d.c. magnetic field was chosen to be as high as practical for sensitivity reasons, and the sweep range was selected to be broad enough to cover the line width.

Figure 4:
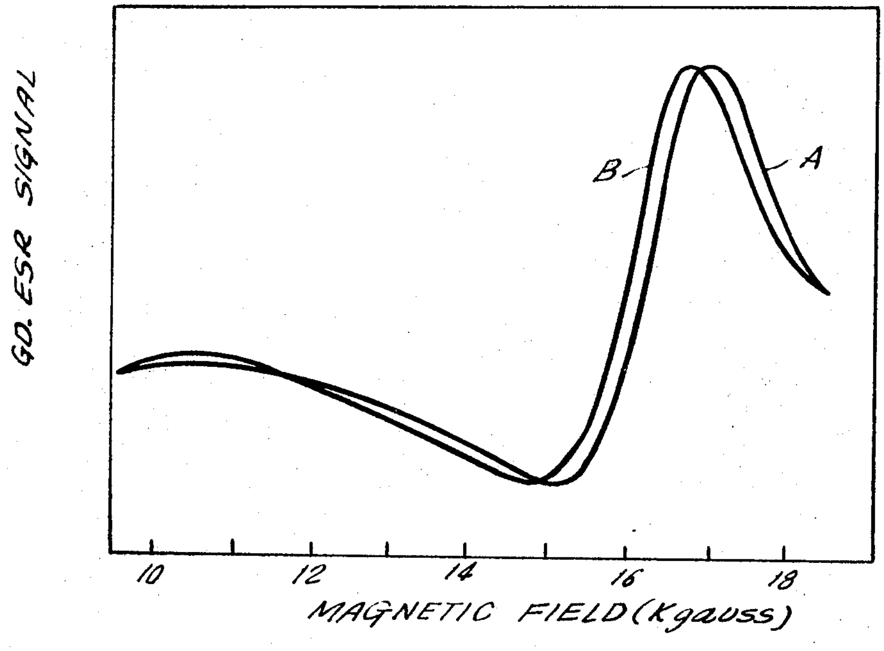
FIG. 4 is a plot showing comparative results for the measurement of the *g* shift of G*d* in a metal by electron spin resonance spectroscopy in which the results obtained are shown for operation with and without the use of the equalization circuit of FIGS. 1 and 2.

In FIG. 4, curve A shows the Gd ESR line using the monitoring circuitry on the same magnet and modulation as described hereinabove. The line A is an admixture of absorption and dispersion signals due to skin effect. The line center is at 16,480 gauss and its width is 1,380 gauss. The determination of the line center is very sensitive to distortion for such curves as is evidenced by the above mentioned article. Curve B of FIG. 4 shows the recorded line under the same conditions as those present in obtaining curve A but without the use of the monitor's circuit, and adjusting modulation amplitude to scale. An error shift of 200 gauss is observed, which is even larger than the real *g* shift of 100 gauss.

Due to the effectiveness of the equalization circuit it has been found that the monitor circuit is useful for exact recording of line shapes, determination of line centers, or comparing line magnitudes at higher magnetic field intensities. The monitor circuit also proved to be helpful in getting more exacting use of magnet and modulator systems, when used as an absolute amplitude monitor, or as a stabilizer.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. Means for stabilizing the amplitude of an induced alternating magnetic field applied in connection with a primary steady magnetic field for measuring a physical phenomenon, said alternating magnetic field being produced by an alternating magnetic field generating means driven by a power amplifier from a suitable alternating signal source, which comprises:

a. a pickup coil positioned within the alternating magnetic field;

b. means for integrating the output signal from the pickup coil to produce an integrated signal representative of both the amplitude and phase of the alternating magnetic field;

c. means for rectifying the integrated signal to produce a rectified signal proportional to the amplitude of the alternating magnetic field;

d. means for producing a reference signal corresponding to the desired amplitude of the alternating magnetic field;

e. means for comparing the rectified and reference signals and producing an error signal representing any deviation from the desired amplitude of the alternating magnetic field; and f. a gain control amplifier coupled between the power amplifier and the signal source, and having its gain controlled by the error signal.

2. The stabilizing means of claim 1 further comprising:

plural ganged multiposition switch means including a first switch portion for coupling the output of said alternating signal source to the input of said gain controlled amplifier and a second switch portion for connecting the output of said integrating means to the input of said rectifying means when said multiposition switch means is in a first position to obtain stabilization;

said first switch portion connecting said integrating means to said rectifying means and connecting the output of said modulation signal source directly to the input of said rectifying means and a third switch portion connecting the output of said rectifying means to the input of said power amplifier when said multiposition switch means is in a second position to adjust the circuit for optimum stabilization.

3. The means of claim 2 further comprising meter means connected to the output of said rectifying means for measuring peak modulation amplitude to adjust said modulation signal source means for optimum operation.

4. The system of claim 1 further comprising phase sensitive detector means coupled to the output of said integrating means to employ the pickup coil signal as a reference for phase sensitive detection and thereby eliminate the need for phase and waveform stabilization.

5. Control means comprising:

first means for generating an unvarying magnetic field;

modulating means coupled to said first means for operating said first means to generate an alternating magnetic field which is superimposed upon said unvarying magnetic field;

gain controlled amplifier means having first and second inputs and an output, said first input and said output being respectively coupled to said first means and said modulating means;

a pickup device positioned within the region of influence of said magnetic field for applying a control signal to the second input of said gain controlled amplifier for varying the gain of said amplifier means in accordance with the field strength detected by said pickup device to stabilize the alternating magnetic field.

6. The control means of claim 5 wherein said pickup device further comprises a pickup coil placed in the region of influence of said magnetic field;

means for integrating the output of said pickup coil;

amplitude detector means coupled to the output of said integrating means;

adjustable reference means;

means for summing the output of said amplitude detector means with said reference means to develop the desired control signal applied to said gain controlled amplifier means for achieving said stabilized field.

7. The control means of claim 6 further comprising:

phase sensitive detecting means coupled to the output of said integrating means for employing the output of said integrating means as a reference signal to thereby eliminate the output distortion of said amplitude detector means due to either modulation amplitude or phase changes.

8. The control means of claim 7 further comprising meter means coupled to said amplitude detecting means for operating said control means as a modulation amplitude peak meter and waveform monitor.

9. The control means of claim 6 further comprising:

ganged switch means which includes first, second and third ganged multiposition switches each capable of being simultaneously moved to either a first, a second, a third or a fourth position;

said first multiposition switch connecting the output of said modulating source to the input of said first means and disconnecting the output of said gain controlled amplifier from said first means when in said first, second or third positions and disconnecting said modulator source from said first means and connecting the output of said gain controlled amplifier to the input of said first means when in said fourth position;

said second multiposition switch disconnecting the output of said detector means from the input of said gain controlled amplifier when in said first, second or third positions and for connecting the output of said detection means to the input of said gain controlled amplifier when in said fourth position;

said third multiposition switch disconnecting said modulating means and said pickup device from said detection means when in said first position, connecting the output of said modulating means to the input of said detection means and disconnecting the output of said pickup device from the input of said detection means when in said second position, disconnecting the output of said modulation means from said detection means and connecting the output of said pickup device to the input of said detection means in either said third or fourth position.

10. Means for stabilizing the amplitude of a modulating magnetic field combined with a steady magnetic field comprising:

first means for generating an alternating magnetic field including oscillator means for generating an alternating signal coupled to said first means;

second means for adding a steady magnetic field to said alternating magnetic field;

a pickup coil positioned within the combined magnetic fields;

means for integrating the output signal of said pickup coil;

means for rectifying the integrated output signal;

a gain controlled amplifier having a signal input coupled to said modulation signal source and a control input for receiving the rectified signal from said rectifier means for generating an output signal whose amplitude is controlled by the signal level at the control input and coupling the gain controlled output signal to said first means to stabilize the modulated magnetic field.

11. Means for stabilizing the phase variation between a primary magnetic field for measuring a physical phenomenon and an induced alternating magnetic field applied in connection therewith, said alternating magnetic field being produced by a magnetic field generating means driven by a power amplifier from a suitable alternating signal source, which comprises:

a. a pickup coil positioned within the alternating magnetic field;

b. means coupled to said pickup coil for integrating the signal from the pickup coil to produce an integrated reference signal representative of both the amplitude and phase of the alternating magnetic field;

c. a gain control amplifier coupled between said power amplifier and said alternating signal source, and having its gain controlled by said signal for stabilizing said alternating magnetic field;

d. a phase sensitive detector coupled to said integrating means for utilizing the reference signal to produce an error signal representing any deviation from the desired phase lag between the reference signal and the signal representing the phenomenon being measured.

* * * * *